US009162676B2

(12) United States Patent
Eto et al.

(10) Patent No.: US 9,162,676 B2
(45) Date of Patent: Oct. 20, 2015

(54) VEHICLE CONTROL DEVICE

(75) Inventors: Shingo Eto, Toyota (JP); Yuji Inoue, Nisshin (JP); Yukihiko Ideshio, Susono (JP); Yousuke Michikoshi, Miyoshi (JP); Terufumi Miyazaki, Toyota (JP); Akihiro Sato, Nagoya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/365,864

(22) PCT Filed: Dec. 16, 2011

(86) PCT No.: PCT/JP2011/079248
§ 371 (c)(1),
(2), (4) Date: Jul. 2, 2014

(87) PCT Pub. No.: WO2013/088577
PCT Pub. Date: Jun. 20, 2013

(65) Prior Publication Data
US 2014/0379189 A1 Dec. 25, 2014

(51) Int. Cl.
*B60W 20/00* (2006.01)
*B60K 6/48* (2007.10)
(Continued)

(52) U.S. Cl.
CPC .............. *B60W 20/40* (2013.01); *B60K 6/387* (2013.01); *B60K 6/48* (2013.01); *B60W 10/02* (2013.01); *B60W 2030/1809* (2013.01); *Y02T 10/6221* (2013.01)

(58) Field of Classification Search
CPC ... F16D 48/062; F16D 48/064; F16D 48/066; B60W 20/00; B60W 10/02; B60W 10/023; B60W 10/04; B60W 10/08; B60W 20/108; B60W 20/40; B60W 2030/1809; B60K 6/387; B60K 6/48; Y02T 10/6221
See application file for complete search history.

(56) References Cited

U.S. PATENT DOCUMENTS 4,408,293 A * 10/1983 Avins .............................. 701/93
6,376,927 B1 * 4/2002 Tamai et al. ................ 290/40 C
(Continued)

FOREIGN PATENT DOCUMENTS

JP  2000 320581  11/2000
JP  2006 118681   5/2006
(Continued)

OTHER PUBLICATIONS

International Search Report Issued Mar. 13, 2012 in PCT/JP11/079248 Filed Dec. 16, 2011.

*Primary Examiner* — Rodney Butler
(74) *Attorney, Agent, or Firm* — Oblon, McClelland, Maier & Neustadt, L.L.P.

(57) ABSTRACT

A control device of a vehicle comprises: an electric motor connected to a drive force transmission path through a first connecting/disconnecting device connecting/interrupting power transmission; and an engine connected to the electric motor through a second connecting/disconnecting device connecting/interrupting power transmission, the control device of a vehicle disconnecting the first connecting/disconnecting device or the second connecting/disconnecting device during running to perform coasting with the engine separated, when performing coasting, a determination whether a vehicle speed is equal to or lower than a predetermined determination vehicle speed implemented, the engine separated by disconnecting the second connecting/disconnecting device with the first connecting/disconnecting device kept connected at a low vehicle speed where the vehicle speed is equal to or lower than the predetermined determination vehicle speed, and the engine separated by disconnecting the first connecting/disconnecting device at a high vehicle speed where the vehicle speed is higher than the predetermined determination vehicle speed.

4 Claims, 4 Drawing Sheets

(51) Int. Cl.
  *B60W 10/02* (2006.01)
  *B60K 6/387* (2007.10)
  *B60W 30/18* (2012.01)

(56) References Cited

U.S. PATENT DOCUMENTS

| | | | |
|---|---|---|---|
| 2007/0102208 A1* | 5/2007 | Okuda et al. | 180/65.3 |
| 2008/0058154 A1* | 3/2008 | Ashizawa et al. | 477/5 |
| 2009/0011887 A1* | 1/2009 | Komada et al. | 475/5 |
| 2009/0124454 A1 | 5/2009 | Tabata et al. | |
| 2011/0174559 A1* | 7/2011 | Saito et al. | 180/65.27 |
| 2012/0077638 A1* | 3/2012 | Kumazaki et al. | 477/5 |

FOREIGN PATENT DOCUMENTS

| | | |
|---|---|---|
| JP | 2007 69787 | 3/2007 |
| JP | 2007 120586 | 5/2007 |
| JP | 2010 149683 | 7/2010 |
| JP | 2011 158079 | 8/2011 |
| JP | 2011-246065 | 12/2011 |

\* cited by examiner

FIG.3

| COASTING MODE | ENGINE | MG | C1 CLUTCH | K0 CLUTCH | L/U CLUTCH |
|---|---|---|---|---|---|
| HIGH SPEED 1 | STOP | POWER RUNNING (LOW ROTATION) | RELEASED | RELEASED | RELEASED |
| HIGH SPEED 2 | STOP | POWER RUNNING (LOW ROTATION) | RELEASED | RELEASED | ENGAGED |
| HIGH SPEED 3 | ROTATION | POWER RUNNING (LOW ROTATION) | RELEASED | ENGAGED | RELEASED |
| HIGH SPEED 4 | OPERATION | REGENERATION | RELEASED | ENGAGED | ENGAGED |
| LOW SPEED 1 | STOP | FREE/ REGENERATION | ENGAGED | RELEASED | ENGAGED |
| LOW SPEED 2 | STOP | FREE | ENGAGED | RELEASED | RELEASED |

VEHICLE CONTROL DEVICE

TECHNICAL FIELD

The present invention relates to a control device of a vehicle and particularly to engine separation control during coasting.

BACKGROUND ART

Patent Document 1 relates to an engine drive vehicle and discloses a technique of separating an engine from wheels when an accelerator is not operated so as to perform coasting with an engine brake made unworkable.

PRIOR ART DOCUMENT

Patent Document

Patent Document 1: Japanese Laid-Open Patent Publication No. 2011-158079

SUMMARY OF THE INVENTION

Problem to be Solved by the Invention

A vehicle is known that includes (a) an electric motor connected to a drive force transmission path through a first connecting/disconnecting device connecting/interrupting power transmission and (b) an engine coupled to the electric motor through a second connecting/disconnecting device connecting/interrupting power transmission. Such a vehicle can disconnect either the first connecting/disconnecting device or the second connecting/disconnecting device during running to perform coasting with the engine separated and, therefore, which connecting/disconnecting device should be disconnected is a problem. In particular, if the second connecting/disconnecting device is disconnected, a connected state of the electric motor and the drive force transmission path is maintained and, therefore, deceleration due to co-rotation of the electric motor (inertia and electrical loss) may deteriorate fuel efficiency and generate heat in the electric motor, while a drive force can promptly be raised by simply increasing torque of the electric motor at the time of reacceleration due to an accelerator operation, resulting in excellent drive force responsiveness (response). Contrarily, if the first connecting/disconnecting device is disconnected, the electric motor is also separated from the drive force transmission path and, therefore, this eliminates the risk of the deterioration in fuel efficiency and the heat generation of the electric motor due to the deceleration caused by co-rotation of the electric motor, while the drive force responsiveness is impaired by the connection of the first connecting/disconnecting device at the time of reacceleration due to an accelerator operation.

The present invention was conceived in view of the situations and it is therefore an object of the present invention to suppress the deterioration in fuel efficiency and the heat generation of the electric motor with impairment of the drive force responsiveness at the time of reacceleration minimized as far as possible in relation to a vehicle capable of disconnecting either the first connecting/disconnecting device or the second connecting/disconnecting device to perform coasting with the engine separated.

Means for Solving the Problem

To achieve the object, the present invention provides a control device of a vehicle comprising: (a) an electric motor connected to wheels through a first connecting/disconnecting device connecting/interrupting power transmission; and (b) an engine connected to the electric motor through a second connecting/disconnecting device connecting/interrupting power transmission, (c) the control device of a vehicle disconnecting either the first connecting/disconnecting device or the second connecting/disconnecting device during running to perform coasting with the engine separated, wherein (d) the engine is separated by disconnecting the second connecting/disconnecting device with the first connecting/disconnecting device kept connected at relatively low vehicle speed, and wherein (e) the engine is separated by disconnecting the first connecting/disconnecting device at relatively high vehicle speed.

The second aspect of the invention provides the control device of a vehicle recited in the first aspect of the invention, comprising (a) a mechanical oil pump between the electric motor and the first connecting/disconnecting device, wherein (b) the mechanical oil pump is rotationally driven by the electric motor during coasting at the relatively high vehicle speed with the first connecting/disconnecting device disconnected.

The third aspect of the invention provides the control device of a vehicle recited in the first or second aspect of the invention, comprising (a) a fluid power transmission device with a lockup clutch between the electric motor and the first connecting/disconnecting device, wherein (b) the lockup clutch is maintained in an engaged state during coasting at the relatively low vehicle speed with the second connecting/disconnecting device disconnected.

The fourth aspect of the invention provides the control device of a vehicle recited in the second aspect of the invention, comprising (a) a fluid power transmission device with a lockup clutch between the electric motor and the first connecting/disconnecting device, wherein (b) the mechanical oil pump is disposed between an output side rotating member of the fluid power transmission device and the first connecting/disconnecting device, and wherein (c) the mechanical oil pump is rotationally driven by the electric motor with the lockup clutch maintained in an engaged state during coasting at the relatively high vehicle speed with the first connecting/disconnecting device disconnected.

Effects of the Invention

Since the control device of a vehicle as described above disconnects the second connecting/disconnecting device with the first connecting/disconnecting device kept connected at low vehicle speed so as to perform coasting with the engine separated, the connected state of the electric motor and the drive force transmission path is maintained and, at the time of reacceleration due to an accelerator operation etc., the drive force can promptly be raised by simply increasing the torque of the electric motor and excellent drive force responsiveness can be acquired. In this case, the deceleration due to co-rotation of the electric motor (inertia and electrical loss) may deteriorate fuel efficiency and generate heat in the electric motor during coasting; however, since the influence is small because of low vehicle speed and a driver's request degree to the drive force responsiveness at the time of reacceleration is higher as compared to high vehicle speed, the acquisition of the excellent drive force responsiveness matches a driver's request even though fuel efficiency etc. slightly deteriorate.

On the other hand, since the first connecting/disconnecting device is disconnected at high vehicle speed to perform coasting with the engine separated, the electric motor is also separated from the drive force transmission path and this eliminates the risk of the deterioration in fuel efficiency and the heat generation of the electric motor due to the deceleration caused by co-rotation of the electric motor. In this case, the drive force responsiveness is impaired by the connection of the first connecting/disconnecting device at the time of reacceleration due to an accelerator operation etc.; however, since a driver's request degree to the drive force responsiveness at the time of reacceleration is relatively lower at high vehicle speed, giving the fuel efficiency priority over the drive force responsiveness matches a driver's request. In other words, by giving priority to the drive force responsiveness at low vehicle speed and giving priority to the fuel efficiency at high vehicle speed to perform coasting, the fuel efficiency can further be improved while a driver's request to the drive force responsiveness at the time of reacceleration is satisfied as much as possible.

In the second aspect of the invention, since the mechanical oil pump is disposed between the electric motor and the first connecting/disconnecting device and the mechanical oil pump is rotationally driven by the electric motor during the high vehicle speed coasting with the first connecting/disconnecting device disconnected, a predetermined hydraulic friction engagement device can be engaged and the portions can be lubricated regardless of the disconnection of the first connecting/disconnecting device. Since the rotation speed of the mechanical oil pump can appropriately be set in this case, the fuel efficiency can further be improved by supplying minimum required oil. In other words, if the first connecting/disconnecting device is connected, since the mechanical oil pump is rotationally driven depending on the vehicle speed, oil is supplied more than necessary at high vehicle speed and the fuel efficiency deteriorates because of deceleration due to stirring resistance etc. at the lubrication parts; however, in this invention, the mechanical oil pump may be rotationally driven at a rotation speed (e.g., about 300 to 500 rpm) capable of supplying minimum required oil for lubrication etc., the deceleration due to stirring resistance etc. is suppressed and the fuel efficiency can further be improved.

In the third aspect of the invention, since the fluid power transmission device with a lockup clutch is disposed between the electric motor and the first connecting/disconnecting device and the lockup clutch is maintained in the engaged state during the low vehicle speed coasting with the second connecting/disconnecting device disconnected, the torque of the electric motor is transmitted through the lockup clutch at the time of reacceleration due to an accelerator operation etc., and excellent drive force responsiveness can be acquired regardless of the presence of the fluid power transmission device.

The fourth aspect of the invention provides the control device recited in the second aspect of the invention further comprising the fluid power transmission device with a lockup clutch between the electric motor and the first connecting/disconnecting device, wherein the mechanical oil pump is disposed between the output side rotating member of the fluid power transmission device and the first connecting/disconnecting device, and wherein the mechanical oil pump is rotationally driven by the electric motor with the lockup clutch maintained in the engaged state during the high vehicle speed coasting at with the first connecting/disconnecting device disconnected. As a result, a power loss due to the fluid power transmission device is prevented when the mechanical oil pump is rotationally driven, and rotation speed control of the mechanical oil pump is facilitated.

BRIEF DESCRIPTION OF THE DRAWINGS

FIG. 3 is a diagram illustrating coasting modes at high vehicle speed and low vehicle speed when coasting is performed in accordance with the flowchart of FIG. 2.

MODE FOR CARRYING OUT THE INVENTION

Figure 1:
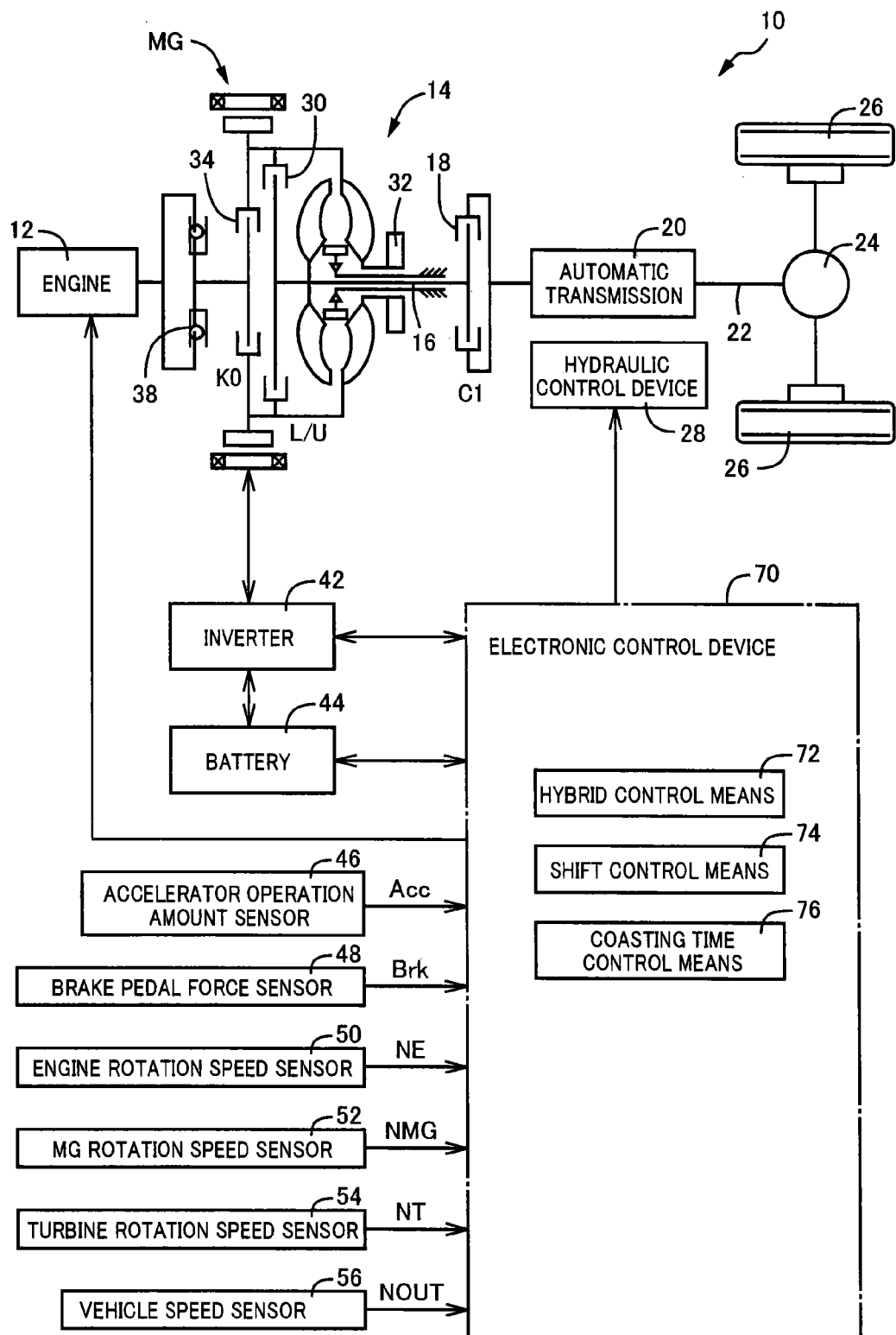
FIG. 1 is a diagram of a general configuration including a schematic of a hybrid vehicle to which the present invention is preferably applied, along with a major portion of a control system.

Although the electric motor is preferably a motor generator also usable as an electric generator, an electric motor without a function of an electric generator is also employable. The engine may be an internal combustion engine generating power from combustion of fuel. Although friction engagement clutches and brakes are preferably used as the first connecting/disconnecting device and the second connecting/disconnecting device, other means capable of connecting/interrupting power transmission are also employable. The first connecting/disconnecting device may be implemented by utilizing an automatic transmission that includes a plurality of clutches and brakes and that can achieve a neutral state. The present invention is preferably applied to a hybrid vehicle running by using the electric motor and the engine as drive force sources.

Coasting means running during accelerator-off, i.e., while at least an accelerator is not operated, regardless of whether a brake is operated for braking, i.e., brake-on, or is not operated, i.e., brake-off. In the case of brake-on during coasting at low vehicle speed with the first connecting/disconnecting device connected, if a motor generator is used as the electric motor, the motor generator can be subjected to regenerative control (also referred to as electric generation control) to generate a braking force and charge a battery.

Whether high vehicle speed or low vehicle speed can be determined based on whether a vehicle speed is equal to or less than a predetermined determination vehicle speed, for example. The determination vehicle speed is defined in advance as a constant value based on whether a driver needs drive force responsiveness at the time of reacceleration from coasting, for example. When the present invention is implemented, the vehicle speed is not necessarily a requirement, and whether high vehicle speed or low vehicle speed can be determined from a rotation speed of another member having a rotation speed varying in accordance with the vehicle speed, for example, a rotation speed of the electric motor when the first connecting/disconnecting device is connected, and this is included in the present invention. If an automatic transmission is included between the first connecting/disconnecting device and wheels, the determination can be made from an output rotation speed of the automatic transmission.

The first connecting/disconnecting device is disconnected at relatively high vehicle speed and the second connecting/disconnecting device is connected/disconnected as needed in consideration of an operation state etc. For example, although it is desirable that the second connecting/disconnecting device is basically disconnected to separate the engine, if an electric storage remaining amount SOC of the battery is equal to or less than a predetermined value, the second connecting/ disconnecting device can be connected to rotationally drive a mechanical oil pump with the engine or to charge the battery through regenerative control of the motor generator acting as the electric motor. Even if the electric storage remaining amount SOC is sufficient, the second connecting/disconnecting device may be connected in preparation for start of the engine.

Although the mechanical oil pump is disposed between the electric motor and the first connecting/disconnecting device in the second aspect of the invention, an electric oil pump may be disposed instead of the mechanical oil pump in the first aspect of the invention. In this case, it is not necessary to operate the electric motor during the coasting at high vehicle speed with the first connecting/disconnecting device disconnected. In the second aspect of the invention, since the mechanical oil pump is rotationally driven at lower rotation than a rotation speed when the mechanical oil pump is rotated by reverse input from the wheels at high vehicle speed, an oil supply amount is reduced as compared to when the first connecting/disconnecting device is connected at high vehicle speed, and deceleration due to stirring resistance etc. can be suppressed to improve fuel efficiency. Although rotation speed capable of supplying minimum required oil for lubrication etc. varies depending on a pump capacity, the rotation speed is, for example, about 300 to 500 rpm, which is sufficiently lower rotation resulting in a smaller supply oil amount as compared to when the first connecting/disconnecting device is connected, and the deceleration due to stirring resistance etc. can significantly be suppressed.

Although the fluid power transmission device with a lockup clutch is included between the electric motor and the first connecting/disconnecting device in the third aspect of the invention and the lockup clutch is maintained in an engaged state during the coasting at low vehicle speed with the second connecting/disconnecting device disconnected, when the first aspect of the invention is implemented, the lockup clutch may be released in preparation for start of the engine or the fluid power transmission device with the lockup clutch itself may be eliminated.

EXAMPLE

An example of the present invention will now be described in detail with reference to the drawings.

FIG. 1 is a diagram of a general configuration including a schematic of a drive system of a hybrid vehicle 10 to which the present invention is preferably applied. The hybrid vehicle 10 includes an engine 12 that is an internal combustion engine such as a gasoline engine and a diesel engine generating power from combustion of fuel and a motor generator MG acting as an electric motor and an electric generator, as drive force sources. The output of the engine 12 and the motor generator MG is transmitted from a torque converter 14 that is a fluid power transmission device via a turbine shaft 16 and a C1 clutch 18 to an automatic transmission 20 and further transmitted via an output shaft 22 and a differential gear device 24 to left and right drive wheels 26. The torque converter 14 includes a lockup clutch (L/U clutch) 30 directly coupling a pump impeller and a turbine impeller, and the pump impeller acting as an input side rotating member is integrally connected to a mechanical oil pump 32, which is mechanically rotationally driven by the engine 12 and the motor generator MG to generate and supply an oil pressure to a hydraulic control device 28. The lockup clutch 30 is engaged and released by an electromagnetic hydraulic control valve, a switching valve, etc. disposed in the hydraulic control device 28. The motor generator MG corresponds to an electric motor.

A K0 clutch 34 is disposed between, and directly couples, the engine 12 and the motor generator MG via a damper 38. The K0 clutch 34 is a single-plate or multi-plate hydraulic friction engagement device frictionally engaged by an oil pressure and acts as a second connecting/disconnecting device connecting and interrupting the engine 12 to/from the motor generator MG. The motor generator MG is connected via an inverter 42 to a battery 44. The automatic transmission 20 is a stepped automatic transmission of planetary gear type etc., having a plurality of gear stages with different gear ratios established depending on an engaged/released state of a plurality of hydraulic friction engagement devices (clutches and brakes) and is subjected to shift control by electromagnetic hydraulic control valves, switching valves, etc. disposed in the hydraulic control device 28. The C1 clutch 18 acts as an input clutch of the automatic transmission 20 and is also subjected to engagement/release control by the hydraulic control device 28. The C1 clutch 18 corresponds to a first connecting/disconnecting device connecting and interrupting the motor generator MG to/from a drive force transmission path.

The hybrid vehicle 10 configured as described above includes an electronic control device 70. The electronic control device 70 includes a so-called microcomputer having a CPU, a ROM, a RAM, an I/O interface, etc., to execute signal processes in accordance with a program stored in advance in the ROM while utilizing a temporary storage function of the RAM. The electronic control device 70 is supplied with a signal indicative of an operation amount (accelerator operation amount) Acc of an accelerator pedal from an accelerator operation amount sensor 46 and is supplied with a signal indicative of a brake pedal tread force (brake pedal force) Brk from a brake pedal force sensor 48. The electronic control device 70 is also supplied with a rotation speed (engine rotation speed) NE of the engine 12, a rotation speed (MG rotation speed) NMG of the motor generator MG a rotation speed (turbine rotation speed) NT of the turbine shaft 16, and a rotation speed (output shaft rotation speed corresponding to a vehicle speed V) NOUT of the output shaft 22, from an engine rotation speed sensor 50, an MG rotation speed sensor 52, a turbine rotation speed sensor 54, and a vehicle speed sensor 56, respectively. The electronic control device 70 is also supplied with various pieces of information necessary for various controls.

The electronic control device 70 functionally includes a hybrid control means 72, a shift control means 74, and a coasting time control means 76. The hybrid control means 72 controls actuation of the engine 12 and the motor generator MG to switch a plurality of predefined running modes, for example, an engine running mode using only the engine 12 as the drive power source for running, a motor running mode using only the motor generator MG as the drive power source for running, and an engine+motor running mode using both for running, depending on an operation state such as the accelerator operation amount (driver's output request amount) Acc and the vehicle speed V for running. The shift control means 74 controls the electromagnetic hydraulic control valves, switching valves, etc. disposed in the hydraulic control device 28 to switch the engaged/released state of the plurality of the hydraulic friction engagement devices, thereby switching the plurality of the gear stages of the automatic transmission 20 in accordance with a shift map defined in advance by using the operation state such as the accelerator operation amount Acc and the vehicle speed V as a parameter.

Figure 2:
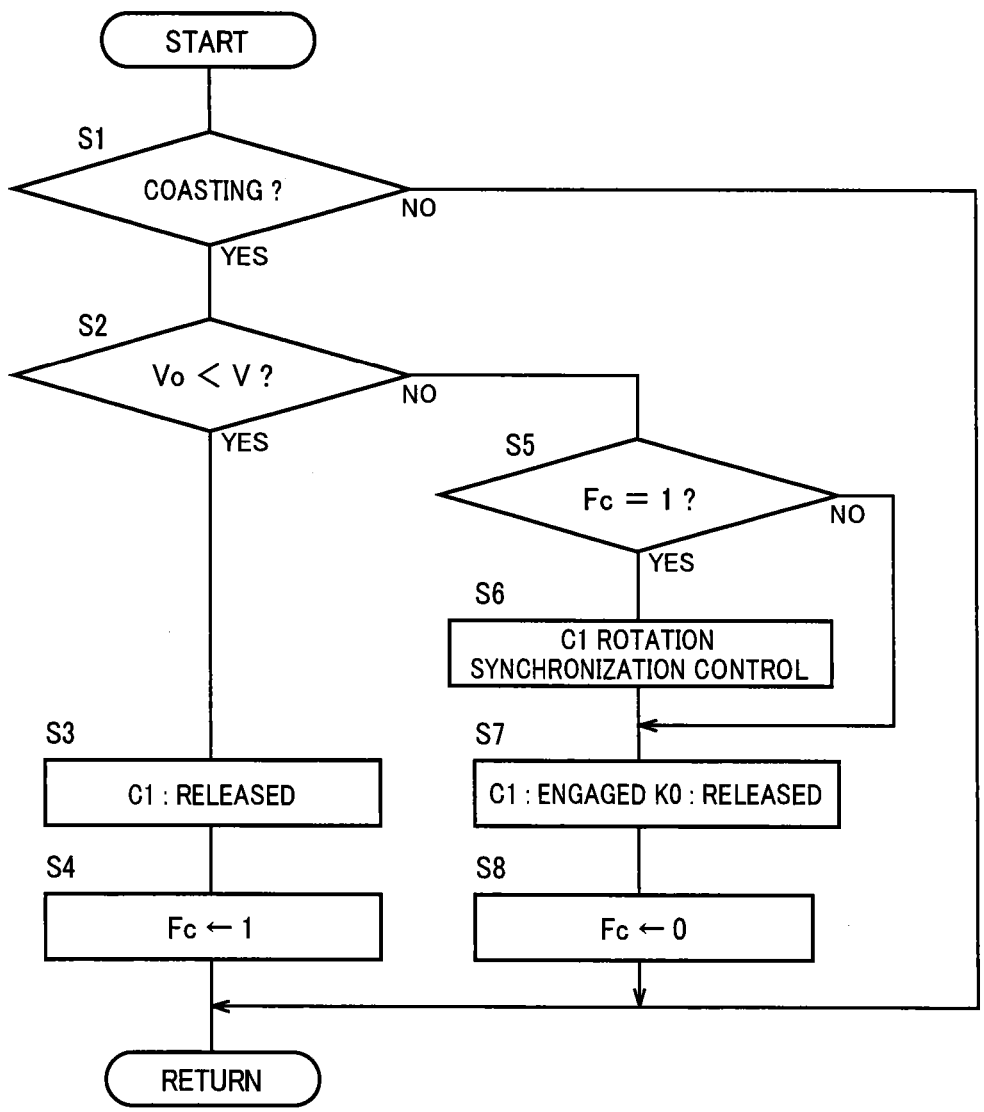
FIG. 2 is a flowchart specifically illustrating an operation of a coasting time control means functionally included in an electronic control device of FIG. 1.

The coasting time control means 76 separates the engine 12 from the drive force transmission path during coasting with an accelerator non-operated at the accelerator operation amount Acc of zero and executes a signal process in accordance with a flowchart of FIG. 2. At step S1 of FIG. 2, it is determined whether the coasting is performed with the accelerator non-operated and if the coasting is performed, step S2 and later are executed. At step S2, it is determined whether the vehicle speed V is a higher vehicle speed than a predefined determination vehicle speed Vo and, in the case of the high vehicle speed satisfying Vo<V, step S3 and later are executed. The determination vehicle speed Vo is set based on whether a driver's request degree to the drive force responsiveness is high at the time of reacceleration from the coasting, and is defined in advance as a constant value of about 50 to 80 km/h, for example.

At step S3, the C1 clutch 18 is released to separate the engine 12 from the drive force transmission path and any coasting mode is established out of high speeds 1 to 4 depicted in FIG. 3. Although any one coasting mode may be defined in advance out of the high speeds 1 to 4, any one mode may be selected depending on an operation state. In the high speed 1, the C1 clutch 18, the K0 clutch 34, and the lockup clutch 30 are all released and the motor generator MG is rotationally driven at low rotation of, for example, about 300 to 500 rpm, so as to establish a predetermined gear stage of the automatic transmission 20 and output a minimum amount of oil required for lubrication etc. of the portions from the mechanical oil pump 32. Although the rotation speed of the motor generator MG may be defined in advance as a constant value, the rotation speed may be variable depending on a required oil amount etc. Since the release of the K0 clutch 34 eliminates a load due to co-rotation of the engine 12 and the release of the lockup clutch 30 reduces a required oil amount, a load of the motor generator MG is minimized. Since the lockup clutch 30 is released at the time of a start request of the engine 12, cranking can promptly be started by simply engaging the K0 clutch 34. Therefore, it is desirable to implement the coasting mode of the high speed 1 during the coasting at high vehicle speed satisfying Vo<V except in special circumstances.

The high speed 2 is different from the high speed 1 in that the lockup clutch 30 is engaged and, although the required oil amount is accordingly increased, the heat generation and the power loss due to stirring of oil in the torque converter 14 are suppressed. Therefore, this is effective when further heat generation is avoided because of high oil temperature.

The high speed 3 is different from the high speed 1 in that the K0 clutch 34 is engaged and, the engine 12 is co-rotated in association with rotation of the motor generator MG. Therefore, although the load of the motor generator MG is made larger by the co-rotation of the engine 12, the engine 12 can promptly be started in association with a start request of the engine 12. The high speed 3 is desirably implemented if an engine start request is near when it is determined whether the engine start request is near, for example.

The high speed 4 is different from the high speed 1 in that the K0 clutch 34 and the lockup clutch 30 are engaged and, the engine 12 is operated at an idle rotation speed of, for example, about 600 to 1000 rpm, to rotationally drive the mechanical oil pump 32 and provide regenerative control of the motor generator MG for charging the battery 44. The high speed 4 is desirably implemented when power running control of the motor generator MG is limited because an electric storage remaining amount SOC of the battery 44 becomes equal to or less than a predetermined value, for example.

When any coasting running mode of the high speeds 1 to 4 is established at step S3, step S4 is executed to set a flag Fc indicative of release of the C1 clutch 18 to "1" and a sequence of engine separation control is terminated to repeat step S1 and later.

If the determination of step S2 is NO (negative), i.e., if the vehicle speed V is a low vehicle speed equal to or less than the determination vehicle speed Vo, it is determined at step S5 whether the flag Fc is "1". In the case of Fc=1, after C1 rotation synchronization control of step S6 is provided, step S7 is executed; however, in the case of Fc≠1, step S6 is skipped and step S7 and later are immediately executed. In other words, if the vehicle speed is a low vehicle speed satisfying V≤Vo from the start of the coasting, since the C1 clutch 18 is engaged, step S7 and later are immediately executed; however, if the vehicle speed is a high vehicle speed satisfying Vo<V at the start of the coasting, resulting in implementation of the coasting mode at high vehicle speed of step S3, and the determination of step S2 is NO because of reduction in the vehicle speed V, since the C1 clutch 18 is released, step S7 is executed after the C1 rotation synchronization control of step S6 is provided. In the C1 rotation synchronization control of step S6, the rotation speed NMG of the motor generator MG is controlled depending on the vehicle speed V, a gear stage of the automatic transmission 20, etc., such that a rotation speed difference between before and after the C1 clutch 18 becomes substantially zero.

At step S7, the C1 clutch 18 is engaged and the K0 clutch 34 is released to separate the engine 12 from the drive force transmission path and either coasting mode of low speeds 1 and 2 depicted in FIG. 3 is established. Although one coasting mode of the low speeds 1 and 2 may be defined in advance, either mode may be selected depending on an operation state. In the low speed 1, the lockup clutch 30 is engaged and, in the case of brake-off, the motor generator MG is made free (freely rotated). In this case, the motor generator MG is connected through the lockup clutch 30, the C1 clutch 18, the automatic transmission 20, etc. to the drive wheels 26 and is co-rotated at a rotation speed corresponding to the vehicle speed V, the gear stage of the automatic transmission 20, etc., and if a depressing operation of the accelerator pedal is performed, the motor generator MG is subjected to the power running control to immediately transmit a power running torque to the drive wheels 26 and the drive force promptly rises. In the case of brake-on, the motor generator MG is subjected to the regenerative control to generate a braking torque at the drive wheels 26 depending on a regenerative torque and to charge the battery 44. Therefore, it is desirable to implement the coasting mode of the low speed 1 during the coasting at low vehicle speed satisfying V≤Vo except in special circumstances. Although the mechanical oil pump 32 is rotationally driven at a rotation speed corresponding to the vehicle speed V, the gear stage of the automatic transmission 20, etc., and the oil is supplied more than necessary to lubrication parts etc., the rotation speed is lower as compared to when the mechanical oil pump 32 is rotationally driven with the C1 clutch 18 engaged at high vehicle speed satisfying Vo<V, resulting in a smaller power loss due to stirring etc. of oil of the lubrication parts.

The low speed 2 is different from the low speed 1 in that the lockup clutch 30 is released. If the lockup clutch 30 is released in this way, the cranking can promptly be started by simply engaging the K0 clutch 34 at the time of a start request of the engine 12. Therefore, it is conceivable that the coasting mode of the low speed 2 is implemented in preparation for the start request of the engine 12 when the regenerative control of the motor generator MG is limited because the electric storage remaining amount SOC of the battery 44 becomes equal to or greater than a predetermined value, for example.

If either coasting mode of the low speeds 1 and 2 is established at step S7, the flag Fc is set to "0" at step S8 and a sequence of engine separation control is terminated to repeat step S1 and later.

Since the hybrid vehicle 10 of this example releases the K0 clutch 34 acting as the second connecting/disconnecting device with the C1 clutch 18 acting as the first connecting/disconnecting device kept engaged at low vehicle speed satisfying V≤Vo so as to perform coasting with the engine 12 separated from the drive force transmission path, the connected state of the motor generator MG and the drive wheels 26 is maintained and, at the time of reacceleration due to an accelerator operation etc., the drive force can promptly be raised by simply increasing the power running torque of the motor generator MG and excellent drive force responsiveness can be acquired. In this case, the deceleration due to co-rotation of the motor generator MG (inertia and electrical loss) may deteriorate fuel efficiency and generate heat in the motor generator MG during coasting; however, since the influence is small because of low vehicle speed and a driver's request degree to the drive force responsiveness at the time of reacceleration is higher as compared to high vehicle speed, the acquisition of the excellent drive force responsiveness matches a driver's request even though fuel efficiency etc. slightly deteriorate.

On the other hand, since the C1 clutch 18 is released at high vehicle speed satisfying Vo<V to perform coasting with the engine 12 separated from the drive force transmission path, the motor generator MG is also separated from the drive wheels 26 and this eliminates the risk of the deterioration in fuel efficiency and the heat generation of the motor generator MG due to the deceleration caused by co-rotation of the motor generator MG. In this case, the drive force responsiveness is impaired by the connection of the C1 clutch 18 at the time of reacceleration due to an accelerator operation etc.; however, since a driver's request degree to the drive force responsiveness at the time of reacceleration is relatively lower at high vehicle speed, giving the fuel efficiency priority over the drive force responsiveness matches a driver's request. In other words, by giving priority to the drive force responsiveness at low vehicle speed and giving priority to the fuel efficiency at high vehicle speed to perform coasting, the fuel efficiency can further be improved while a driver's request to the drive force responsiveness at the time of reacceleration is satisfied as much as possible.

In this example, since the mechanical oil pump 32 is disposed between the motor generator MG and the C1 clutch 18 and the mechanical oil pump 32 is rotationally driven by the motor generator MG in the high speeds 1 to 3 of the high vehicle speed coasting mode with the C1 clutch 18 disconnected, a predetermined hydraulic friction engagement device can be engaged and the portions can be lubricated regardless of the release of the C1 clutch 18. Since the rotation speed of the mechanical oil pump 32 can appropriately be set in this case, the fuel efficiency can further be improved by supplying minimum required oil. In other words, if the C1 clutch 18 is connected, since the mechanical oil pump 32 is rotationally driven depending on the vehicle speed V, oil is supplied more than necessary at high vehicle speed and the fuel efficiency deteriorates because of deceleration due to stirring resistance etc. at the lubrication parts; however, in this example, the mechanical oil pump 32 may be rotationally driven at a rotation speed (e.g., about 300 to 500 rpm) capable of supplying minimum required oil for lubrication etc., the deceleration due to stirring resistance etc. is suppressed and the fuel efficiency can further be improved.

In this example, since the torque converter 14 with a lockup clutch is disposed between the motor generator MG and the C1 clutch 18 and the lockup clutch 30 is maintained in the engaged state in the low speed 1 of the low vehicle speed coasting mode with the K0 clutch 34 released, the power running torque of the motor generator MG is transmitted through the lockup clutch 30 toward the drive wheels 26 at the time of reacceleration due to an accelerator operation etc., and excellent drive force responsiveness can be acquired regardless of the presence of the torque converter 14.

Figure 4:
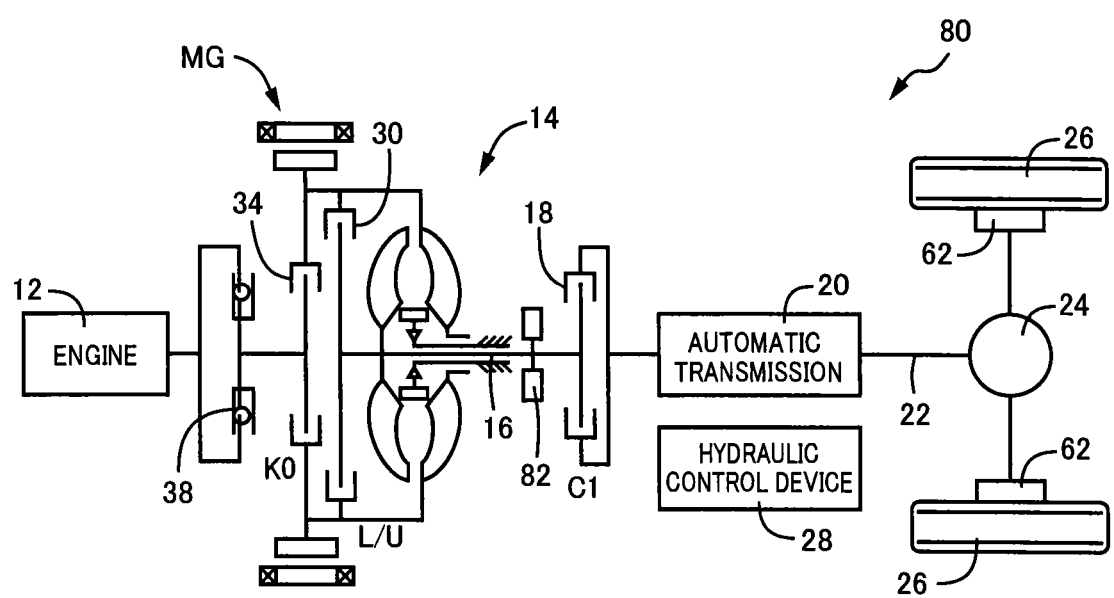
FIG. 4 is a diagram illustrating another example of the present invention, the drawing being a schematic of a hybrid vehicle.

Although the mechanical oil pump 32 is disposed on the pump impeller that is the input side rotating member of the torque converter 14, a mechanical oil pump 82 can be disposed on the turbine shaft 16 between the turbine impeller that is the output side rotating member of the torque converter 14 and the C1 clutch 18 as in a hybrid vehicle 80 depicted in FIG. 4. The coasting modes of the high speeds 1 to 4 and the slow speeds 1 and 2 depicted in FIG. 3 can be implemented also in this case and the same effects as the example can be acquired. If the coasting mode of the high speed 2 is established during coasting at high vehicle speed with the C1 clutch 18 released, since the mechanical oil pump 82 is rotationally driven by the motor generator MG with the lockup clutch 30 maintained in the engaged state, a power loss due to the torque converter 14 is prevented when the mechanical oil pump 82 is rotationally driven, and rotation speed control of the mechanical oil pump 82 is facilitated.

Although the example of the present invention has been described in detail with reference to the drawings, this is merely an embodiment and the present invention can be implemented in variously modified and improved forms based on the knowledge of those skilled in the art.

NOMENCLATURE OF ELEMENTS 10, 80: hybrid vehicle (vehicle) 12: engine 14: torque converter (fluid power transmission device) 18: C1 clutch (first connecting/disconnecting device) 30: lockup clutch 32, 82: mechanical oil pump 34: K0 clutch (second connecting/disconnecting device) 70: electronic control device 76: coasting time control means MG: motor generator (electric motor) Vo: determination vehicle speed

The invention claimed is:

1. A control device of a vehicle comprising:
an electric motor connected to a drive force transmission path through a first connecting/disconnecting device connecting/interrupting power transmission; and
an engine connected to the electric motor through a second connecting/disconnecting device connecting/interrupting power transmission,
the control device of a vehicle disconnecting either the first connecting/disconnecting device or the second connecting/disconnecting device during running to perform coasting with the engine separated,
when performing coasting, a determination whether a vehicle speed is equal to or lower than a predetermined determination vehicle speed being implemented,
the engine being separated by disconnecting the second connecting/disconnecting device with the first connecting/disconnecting device kept connected at a low vehicle speed in which the vehicle speed is equal to or lower than the predetermined determination vehicle speed, and
the engine being separated by disconnecting the first connecting/disconnecting device at a high vehicle speed in which the vehicle speed is higher than the predetermined determination vehicle speed.

2. The control device of a vehicle of claim 1, comprising a mechanical oil pump between the electric motor and the first connecting/disconnecting device, wherein
 the mechanical oil pump is rotationally driven by the electric motor during coasting at the high vehicle speed with the first connecting/disconnecting device disconnected.

3. The control device of a vehicle of claim 1, comprising a fluid power transmission device with a lockup clutch between the electric motor and the first connecting/disconnecting device, wherein
 the lockup clutch is maintained in an engaged state during coasting at the low vehicle speed with the second connecting/disconnecting device disconnected.

4. The control device of a vehicle of claim 2, comprising a fluid power transmission device with a lockup clutch between the electric motor and the first connecting/disconnecting device, wherein
 the mechanical oil pump is disposed between an output side rotating member of the fluid power transmission device and the first connecting/disconnecting device, and wherein
 the mechanical oil pump is rotationally driven by the electric motor with the lockup clutch maintained in an engaged state during coasting at the high vehicle speed with the first connecting/disconnecting device disconnected.

* * * * *